US008481919B2

(12) United States Patent
Teague

(10) Patent No.: US 8,481,919 B2
(45) Date of Patent: Jul. 9, 2013

(54) APPARATUS AND METHOD FOR CONTROLLABLE DOWNHOLE PRODUCTION OF IONIZING RADIATION WITHOUT THE USE OF RADIOACTIVE CHEMICAL ISOTOPES

(75) Inventor: Phil Teague, Stavanger (NO)

(73) Assignee: Visuray Technology Ltd. (MT)

( * ) Notice: Subject to any disclaimer, the term of this patent is extended or adjusted under 35 U.S.C. 154(b) by 0 days.

(21) Appl. No.: 13/388,306

(22) PCT Filed: Oct. 20, 2010

(86) PCT No.: PCT/NO2010/000372
§ 371 (c)(1),
(2), (4) Date: Feb. 1, 2012

(87) PCT Pub. No.: WO2011/049463
PCT Pub. Date: Apr. 28, 2011

(65) Prior Publication Data

US 2012/0126104 A1 May 24, 2012

(30) Foreign Application Priority Data

Oct. 23, 2009 (NO) .................................. 20093204

(51) Int. Cl.
*G01V 5/00* (2006.01)

(52) U.S. Cl.
USPC .......................................................... 250/253

(58) Field of Classification Search
USPC ................................ 250/253, 256, 264, 266
See application file for complete search history.

(56) References Cited

U.S. PATENT DOCUMENTS 5,442,678 A 8/1995 Dinsmore et al.
5,523,939 A 6/1996 Stephenson (Continued)

FOREIGN PATENT DOCUMENTS

JP 2001-45761 2/2001
JP 2002-324697 11/2002
JP 2004-504710 2/2004

OTHER PUBLICATIONS

International Search Report dated Feb. 11, 2011 issued in corresponding international application No. PCT/NO2010/000372.

(Continued)

*Primary Examiner* — David Porta
*Assistant Examiner* — Faye Boosalis
(74) *Attorney, Agent, or Firm* — Ostrolenk Faber LLP

(57) ABSTRACT

Apparatus for the controllable downhole production of ionizing radiation (12), the apparatus including at least a thermionic emitter (11) which is arranged in a first end portion (7a) of an electrically insulated vacuum container (9), and a lepton target (6) which is arranged in a second end portion (7*b*) of the electrically insulated vacuum container (9); the thermionic emitter (11) being connected to a series of serially connected negative electrical-potential-increasing elements ($\mathbf{14}_1$, $\mathbf{14}_2$, $\mathbf{14}_3$, $\mathbf{14}_4$), each of said electrical-potential-increasing elements ($\mathbf{14}_1$, $\mathbf{14}_2$, $\mathbf{14}_3$, $\mathbf{14}_4$) being arranged to increase an applied direct-current potential ($\delta V_0$, $\delta V_1$, $\delta V_{1+2}$, . . . , $\delta V_{1+2+3}$) by transforming an applied, driving voltage ($V_{AC}$), and to transmit the increased, negative direct-current potential ($\delta V_1$, $\delta V_{1+2}$, . . . , $\delta V_{1+2+3+4}$) and also the driving voltage ($V_{AC}$) to the next unit in the series of serially connected elements ($\mathbf{14}_1$, $\mathbf{14}_2$, $\mathbf{14}_3$, $\mathbf{14}_4$5), and the ionizing radiation (12) exceeding 200 keV with a predominant portion of the spectral distribution within the Compton range.

11 Claims, 4 Drawing Sheets

U.S. PATENT DOCUMENTS

| | | | |
|---|---|---|---|
| 5,680,431 | A | 10/1997 | Pietras, III et al. |
| 6,885,728 | B2 | 4/2005 | Hadland et al. |
| 7,279,677 | B2 | 10/2007 | Ellis et al. |
| 7,564,948 | B2 | 7/2009 | Wraight et al. |
| 2008/0152080 | A1 | 6/2008 | Shampine et al. |
| 2009/0147907 | A1 | 6/2009 | Wraight |

OTHER PUBLICATIONS

Written Opinion dated Feb. 11, 2011 issued in corresponding international application No. PCT/NO2010/000372.

Japanese Office Action, dated Feb. 26, 2013, issued in corresponding Japanese Patent Application No. 2012-530835. Total 6 pages, including English Translation.

APPARATUS AND METHOD FOR CONTROLLABLE DOWNHOLE PRODUCTION OF IONIZING RADIATION WITHOUT THE USE OF RADIOACTIVE CHEMICAL ISOTOPES

CROSS REFERENCE TO RELATED APPLICATIONS

The present application is a 35 U.S.C. §371 National Phase conversion of PCT/NO2010/000372, filed Oct. 20, 2010, which claims benefit of Norwegian Application No. 20093204, filed Oct. 23, 2009, the disclosure of which is incorporated herein by reference. The PCT International Application was published in the English language.

SUMMARY OF THE INVENTION

An apparatus for the controllable, downhole production of ionizing radiation is described, more particularly characterized by the apparatus including at least a thermionic emitter which is arranged in a first end portion of an electrically insulated vacuum container, and a lepton target which is arranged in a second end portion of the electrically insulated vacuum container; the thermionic emitter being connected to a series of serially connected negative electrical-potential-increasing elements, each of said electrical-potential-increasing elements being arranged to increase an applied direct-current potential by transforming an applied, driving voltage, and transmit the increased, negative direct-current potential and also the driving voltage to the next unit in the series of serially connected elements, and the ionizing radiation exceeding 200 keV with a predominant portion of the spectral distribution within the Compton range.

In borehole logging and data acquisition for downhole material compositions, radioactive isotopes are used to a great extent today. With the prior art it has not been possible to use non-radioactive systems capable of producing the photon energies required in order to replace the emitted energy of conventional radioactive isotopes used in logging operations in boreholes and the like, that is to say an apparatus which has X-ray/gamma radiation greater than 200 keV and is arranged in a housing with a diameter of less than 4" (101 mm). Today, the typically largest diameter of housings accommodating logging equipment is in the order of 3⅝" (92 mm) or less.

The emission rate, and therefore the intensity, of isotopes is a function of their radioactive half-life. To reduce the time required to record a statistically reliable quantity of detected secondary photons, the isotope must have a correspondingly short half-life, possibly larger amounts of material must be used to increase the output. This leads to a difficult balance between economy and safety; the longer a logging operation takes, the higher the costs associated with the infrastructure (such as drilling-rig time) and/or loss of production; and the shorter the logging operation time is, the greater risk attaches to the isotope used, and the more extensive safety precautions must be taken when handling the isotope.

The invention has for its object to remedy or reduce at least one of the drawbacks of the prior art, or at least provide a useful alternative to the prior art.

The object is achieved by features which are specified in the description below and in the claims that follow.

Having the ability to produce high-energy radiation in the form of X-ray/gamma radiation "on demand" in a borehole or the like without the use of highly radioactive chemical isotopes will be very advantageous within the oil and gas industry during density logging, logging while drilling, measurements while drilling and during the logging of well operations.

In what follows, the term "lepton" is used. Lepton comes from the Greek λεπτόυ, which means "small" or "thin". In physics a particle is a lepton if it has spin-½ and does not experience colour power. Leptons form a family of elementary particles. There are 12 known types of leptons, 3 of which are particles of matter (the electron, the muon and the tau lepton), 3 neutrinos, and their 6 respective antiparticles. All charged leptons known have a single negative or positive electric charge (depending on whether they are particles or antiparticles), and all the neutrinos and antineutrinos are electrically neutral. In general, the number of leptons of the same type (electrons and electron neutrinos; muons and muon neutrinos; tauons and tau neutrinos) remains the same when particles interact. This is known as lepton number conservation.

The current controls, logistics, handling and safety measures associated with radioactive isotopes in the oil and gas industry entail high costs, and a system which does not require the use of radioactive, chemical isotopes but can produce equivalent radiation "on demand" will eliminate many of the control and logistic costs connected with the handling of isotopes.

As a consequence of the more thorough controls imposed on the storage, use and movement of highly radioactive, chemical isotopes owing to the introduction of anti-terrorism precautions, the costs relating to safety and logistics associated with the many thousands of isotope materials that are used on a daily basis within the industry have increased dramatically.

The invention provides an apparatus and a method which make it possible to produce X-ray/gamma radiation with spectral components within the Compton range with a radiant output by accelerating leptons between two electrodes of oppositely polarized high electrical potentials, each electrode being maintained at a controllable potential by a system of electrical-potential-increasing stages, the stages being arranged to permit very high voltages (above 100,000 V) to be produced and controlled in an electrically grounded, preferably cylindrical housing with a transverse dimension of less than 4" (101 mm). Consequently, the output of the system is many times larger than that of gamma-emitting isotopes, which results in a considerable reduction in the time required to log a satisfactory amount of data during logging operations, so that both the overall time consumption and the costs are reduced. The system does not use highly radioactive isotopes, thereby eliminating the need for the control, handling and safety routines connected with radioactive isotopes.

The apparatus is provided with components arranged to generate ionizing radiation whenever required in a borehole environment without the use of highly radioactive, chemical isotopes such as cobalt 60 or caesium 137, for example.

The apparatus includes the following main components:

- A modular system for the production and control of high electrical potentials, both positive and negative ones, within a grounded, preferably cylindrical housing with a relatively small diameter.
- A system for maintaining electrical separation of the high, electrical potentials and ground, which involves field control geometries, pressurized gaseous electrically insulating materials and creepage-inhibiting support geometries.
- A system which utilizes the electrical field formed of the dipolar, electrical potentials to accelerate leptons towards a lepton target.

A target and lepton stream geometry which results in the production of ionizing radiation in a radial emission rotationally symmetrical around the longitudinal axis of the apparatus.

The invention relates more specifically to an apparatus for the controllable, downhole production of ionizing radiation, characterized by the apparatus including at least a thermionic emitter which is arranged in a first end portion of an electrically insulated vacuum container, and a lepton target which is arranged in a second end portion of the electrically insulated vacuum container;

the thermionic emitter being connected to a series of serially connected negative electrical-potential-increasing elements, each of said electrical-potential-increasing elements being arranged to increase an applied direct-current potential by transforming an applied driving voltage and to transmit the increased negative direct-current potential and also the driving voltage to the next unit in the series of serially connected elements, and the ionizing radiation exceeding 200 keV with a predominant portion of the spectral distribution within the Compton range.

The vacuum container may be a vacuum tube. This gives a considerable reduction in the emission resistance of the vacuum container.

The lepton target can be formed in a rotationally symmetrical shape. This gives improved radiation distribution in all directions out from the apparatus.

The lepton target may be formed in a conical shape. The advantage of this is that the random scattering of the thermionic emission will result in radiation evenly distributed over the entire circumference of the apparatus.

The lepton target may substantially be provided by a material, an alloy or a composite taken from the group consisting of tungsten, tantalum, hafnium, titanium, molybdenum, copper and also any non-radioactive isotope of an element which exhibits an atomic number higher than 55. This gives a higher degree of output within a favourable part of the radiation spectrum.

The lepton target may be connected to a series of serially connected positive electrical-potential-increasing elements, each of said electrical-potential-increasing elements being arranged to increase an applied direct-current potential by transforming an applied high-frequency driving voltage, and to transmit the increased positive direct-current potential and also said alternating voltage to the next unit in the series of serially connected elements. This gives improved control of the voltage field geometry.

The driving voltage may be an alternating voltage with a frequency above 60 Hz. A given energy can thereby be generated with lower capacity requirements for current-carrying components.

A spectrum-hardening filter may be arranged to eliminate a portion of low-energy radiation from the ionizing radiation generated. The filtration thereby removes noise from the radiation output.

A spectrum-hardening filter may be formed of a material, an alloy or a composite taken from the group consisting of copper, rhodium, zirconium, silver and aluminium. Radiation within a desired spectral region may thereby be generated.

At the lepton target a beam shield may be arranged, having one or more apertures arranged to create directionally controlled radiation. The radiation may thus be directionally controlled, if desirable.

The apparatus may include a housing which is arranged to be pressurized with an electrically insulating substance in gaseous form. This gives a reduced risk of sparking and electrical flashover.

The electrically insulating substance may be sulphur hexafluoride. Sulphur hexafluoride has very good insulating properties.

The housing may exhibit a transverse dimension that does not exceed 101 mm (4"). The apparatus is thereby well suited for all downhole logging environments.

Each electrical-potential-increasing element may include means arranged to apply an input potential equal to its own input potential to the following electrical-potential-increasing element.

BRIEF DESCRIPTION OF THE DRAWINGS

In what follows is described an example of a preferred embodiment which is visualized in accompanying drawings, in which.

DESCRIPTION OF PREFERRED EMBODIMENTS

Figure 1:
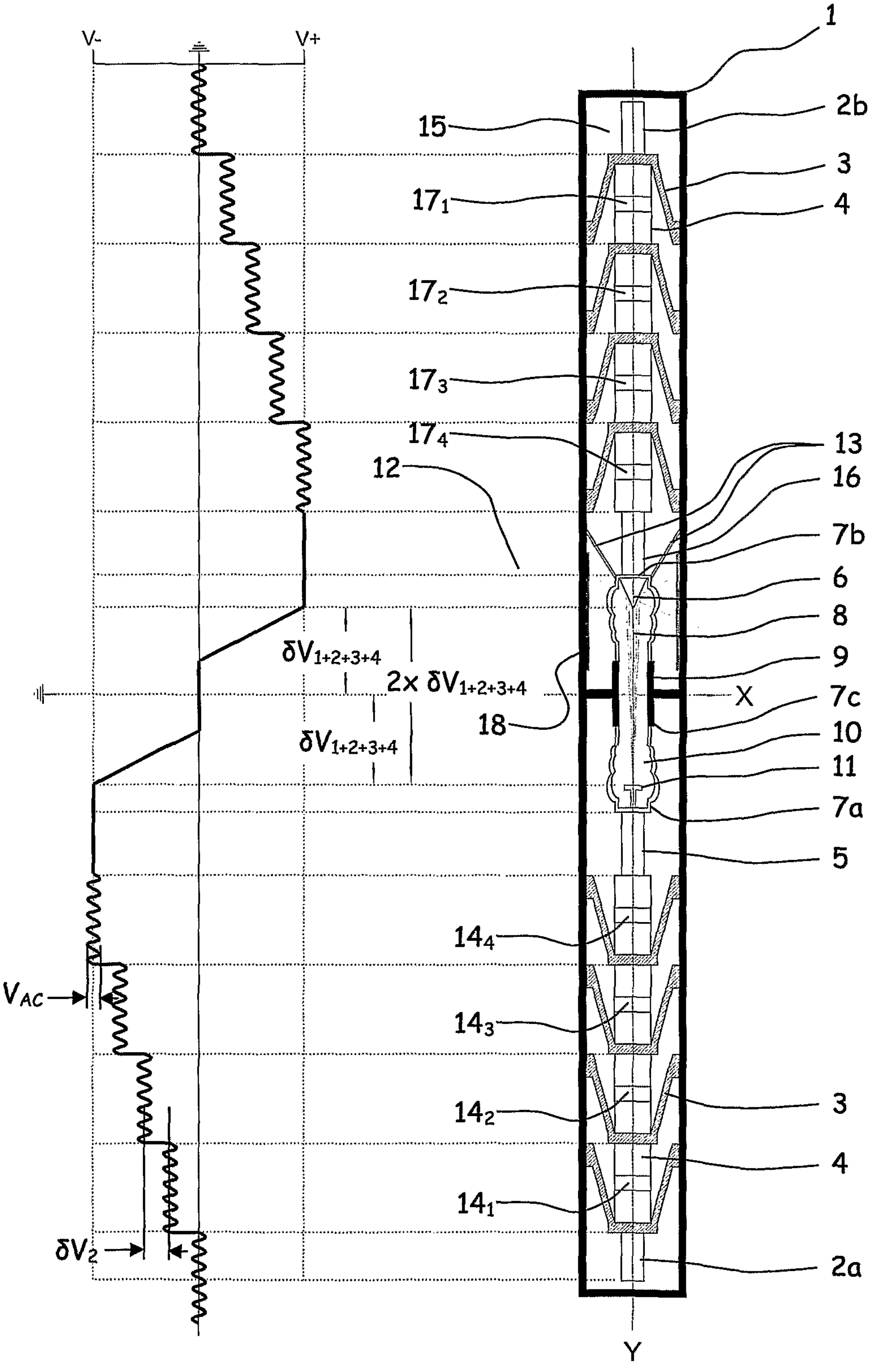
FIG. 1 shows a longitudinal section through a first dual-polarity exemplary embodiment of an apparatus according to the invention, a thermionic emitter and a lepton target being connected to respective series of electrical-potential-increasing elements, and a graph which shows the electrical potential for every stage in the increasing-element series.
Figure 2:
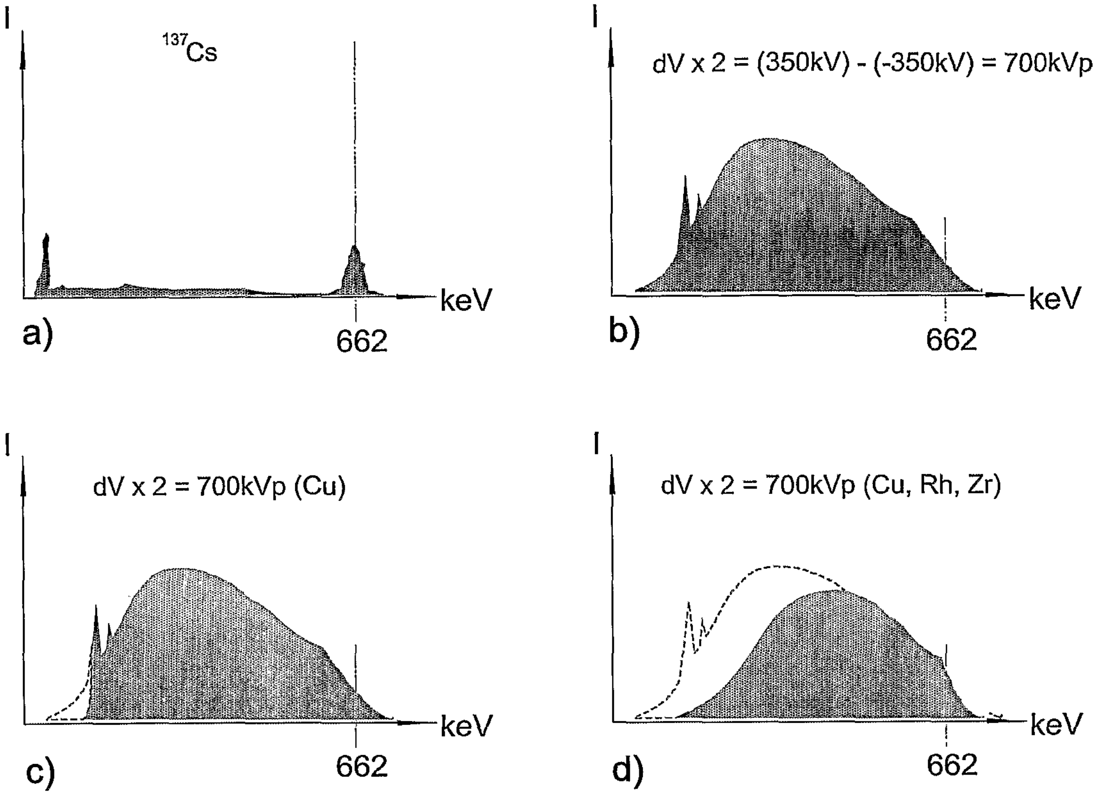
FIG. 2*a* shows a typical emitted spectrum for a caesium 137 chemical isotope.
FIG. 2*b* shows a typical output of the apparatus according to the invention when a current potential of −350,000 V has been applied to a thermionic emitter and a current potential of +350,000 V has been applied to a lepton target.
FIG. 2*c* shows the result of the same constellation as in FIG. 2*b*, but a spectrum filter of pure copper having been used.
FIG. 2*d* shows the effect of a spectrum filter made of a composite consisting of copper, rhodium and zirconium.

In the figures, the reference numeral 1 indicates a fluids tight, cylindrical housing with an outer diameter which does not exceed 4" (101 mm). The housing 1 is rotationally symmetrical around a longitudinal axis and is arranged to be electrically grounded. The housing 1 is preferably arranged to be pressurized with an electrically insulating substance 15 in gaseous form, sulphur hexafluoride in one embodiment. A thermionic emitter 6, and a lepton target, are arranged in a cylindrical vacuum container 9 which is provided by two electrically insulating caps 7$a$, 7$b$ forming closed end portions of a tube 7$c$ which is electrically connected to the enveloping housing 1, said container 9 thereby forming an electrically grounded support structure as well as an electrical-field-focussing tube.

In the preferred embodiment no detector system is included in the apparatus for the purpose of assisting in the data acquisition during the logging operation, but if desired, shielded photon detectors, such as sodium-iodide- or caesium-iodide-based detector systems or any other type of detector or detectors, may be placed around the perimeter of the cylindrical vacuum container 9 placed within the external diameter of the grounded cylindrical housing 1 with no consequence as regards high potential field influence on the electronic systems of the detectors.

In the preferred embodiment, leptons 8 are produced with the thermionic emitter 11, but radio frequency and cold cathode methods may also be used.

The thermionic emitter 11 is kept warm and at a high, negative electrical potential relative to the grounded housing 1 by means of a serially connected system of two or more negative electrical-potential-increasing elements $\mathbf{14}_{1-n}$, four $\mathbf{14}_1$-$\mathbf{14}_4$ shown here. The initial increasing element $\mathbf{14}_1$ which provides the first potential increase within the serially connected system is powered by an electrical control 2 which is fed direct or alternating current of typically between 3 and 400 V supplied from a remote power supply (not shown). The control 2 outputs a driving alternating voltage $V_{AC}$ at a frequency above 60 Hz, preferably up to 65 kHz or higher, and the negative electrical-potential-increasing elements $\mathbf{14}_1$-$\mathbf{14}_4$ are configured in such a way that a system of transformer coils within each stage are used to increase a negative potential $\delta V_1$, $\delta V_{1+2}$, $\delta V_{1+2+3}$, $\delta V_{1+2+3+4}$ of the alternating current relative to the ground potential of the surrounding housing 1, so that the series of negative electrical-potential-increasing elements $\mathbf{14}_1$-$\mathbf{14}_4$ increases the electrical potential in steps to an overall level above −100,000 V.

Each negative electrical-potential-increasing element $\mathbf{14}_1$-$\mathbf{14}_4$ is centrally arranged and supported within the electrically grounded housing 1 by a rotationally symmetrical support structure 3 made of a material or composite of materials with high dielectric resistivity and good thermal conductivity. In a preferred embodiment a mixture of polyacryletheretherketone and boron nitride is used, but any material having high dielectric resistivity may be used. The rotationally symmetrical support structure 3 is configured in such a way that the distance that electrical energy will have to cover along the surface or through the material of the support structure 3 from the negative electrical-potential-increasing elements $\mathbf{14}_1$-$\mathbf{14}_4$ to the grounded surrounding housing 1 is much larger than the physical radial distance between the negative electrical-potential-increasing elements $\mathbf{14}_1$-$\mathbf{14}_4$ and the housing 1, so that electrical flashover or sparking between conductors with large differences in voltage is inhibited. To ensure that the distribution of electrical potential across the surface of the negative electrical-potential-increasing elements $\mathbf{14}_1$-$\mathbf{14}_4$ is continuously maintained, in order thereby to prevent possible disturbances which may lead to sparking or flashover, a cylindrical field controller 4 is arranged on the outside of each negative electrical-potential-increasing element $\mathbf{14}_1$-$\mathbf{14}_4$ to ensure that the radial potential between each of the negative electrical-potential-increasing elements $\mathbf{14}_1$-$\mathbf{14}_4$ and the enveloping housing 1 remains constant across the entire axial extent of the electrical-potential-increasing element $\mathbf{14}_1$-$\mathbf{14}_4$, thereby forming a homogeneous field towards ground regardless of the electrical potential $\delta V_1$, $\delta V_{1+2}$, $\delta V_{1+2+3}$, $\delta V_{1+2+3+4}$ of the specific negative electrical-potential-increasing element $\mathbf{14}_1$-$\mathbf{14}_4$. Rather than using only one single-stage negative electrical-potential-increasing element, the use of multi-stage negative electrical-potential-increasing elements $\mathbf{14}_1$-$\mathbf{14}_4$ ensures that the total electrical potential between each end of a stage can be reduced to a minimum controllable potential per stage (see the potential difference graph in FIG. 1) in order thereby to ensure that the potential differences between or across components within each stage do not result in sparking or flashover because of the short distances normally used in electrical circuits.

The output power from the electrical control 2 may be increased or decreased in order thereby to control the magnitude of the output of the negative electrical increasing elements $\mathbf{14}_1$-$\mathbf{14}_4$. But any arrangement whereby each stage in the system may include devices for increasing the total potential provided may be within the scope of the invention. For example, a diode-/capacitor-based voltage multiplier or half-wave series multiplier or Greinacher/Villard system may be used in such a system.

A thermionic-emitter driver 5 rectifies the high-potential alternating current to deliver a rectified, high-voltage current to the thermionic emitter 11. A current for driving the thermionic emitter 11 and maintaining the thermionic emitter 11 at an electrical-potential difference of more than −100,000 V is thereby provided. As the differential of the alternating voltage remains unchanged in each stage of the serially connected system of negative electrical-potential-increasing elements $\mathbf{14}_1$-$\mathbf{14}_4$, only the direct-current component is altered.

In a preferred embodiment, each transformer coil will be arranged in such a way that a tertiary winding of a 1:1 ratio relative to a primary winding is inductively coupled so that a component failure of any stage will not result in output failure in the production of high potentials over the serially connected system as the alternating-current component will be carried through the next negative electrical-potential-increasing element 14 independently of whether the direct-voltage level has been elevated or not.

The thermionic-emitter driver 5 can be electrically powered from the rectified alternating-current component from the output of the negative electrical-potential-increasing elements $\mathbf{14}_1$-$\mathbf{14}_4$. The thermionic-emitter driver 5 and a negative electrical control driver 2$a$ communicate in a wireless manner to ensure that the output of the negative electrical-potential-increasing elements $\mathbf{14}_1$-$\mathbf{14}_4$ can be verified without the need for instrumentation wires between the two drivers 2$a$, 5. In a preferred embodiment radio communication is used, with an antenna arranged on the thermionic-emitter driver 5 and on the negative electrical control driver 2$a$, but by a direct line of sight a laser may also be used by alignment of optical windows or apertures in the series of the negative potential-increasing elements $\mathbf{14}_1$-$\mathbf{14}_4$.

Similarly, a serially connected system of positive potential-increasing elements $\mathbf{17}_1$-$\mathbf{17}_4$ similar in function to the negative potential-increasing elements $\mathbf{14}_1$-$\mathbf{14}_4$ is arranged. They are arranged in such a way that the output is connected to a lepton target 6 via a lepton target driver 16 so that each stage gradually increases the potential to provide a high positive electrical potential $\delta V_{1+2+3+4}$ from the output of the serially connected system of positive potential-increasing elements $\mathbf{17}_1$-$\mathbf{17}_4$. The lepton target driver 16 rectifies the positive alternating current from the output of the positive electrical-potential-increasing elements $\mathbf{17}_1$-$\mathbf{17}_4$ to maintain the lepton target 6 at an electrical-potential difference greater than +100,000 V.

The lepton target driver 16 and a positive electrical control driver 2$b$ communicate in a wireless manner to ensure that the output of the positive electrical-potential-increasing elements $17_1$-$17_4$ can be verified without any need for instrumentation wires between the two drivers 2*b*, 16. In a preferred embodiment radio communication is used, with an antenna arranged on the lepton target driver 16 and on the positive electrical control driver 2*b*, but by a direct line of sight a laser may also be used by alignment of optical windows or apertures in the series of the positive electrical-potential-increasing elements $17_1$-$17_4$.

Leptons 8 which are accelerated within the strong dipole electrical field created by the high negative potential of the thermionic emitter 11 and the high positive potential of the lepton target 6 stream unabated through the vacuum 10 of the container 9 and collide with the lepton target 6 at a high velocity. The kinetic energy of the leptons 8, which increases by the acceleration in the electrical field generated between the thermionic emitter 11 and the lepton target 6, is released as ionizing radiation 12 upon collision with the lepton target 6 because of the sudden loss of kinetic energy. As the lepton target 6 maintains its high positive potential, the leptons 8 are electrically transported away from the lepton target 6 by means of the positive potential-increasing elements 17 towards the positive control driver 2*b*.

In a preferred embodiment, the lepton target 6 is a conical structure formed of tungsten, but alloys and composites of tungsten, tantalum, hafnium, titanium, molybdenum and copper can be used in addition to any non-radioactive isotope of an element which exhibits a high atomic number (higher than 55). The lepton target 6 may also be formed in any rotationally symmetrical shape, such as a cylindrical or circular hyperboloid or any variant exhibiting rotational symmetry.

The natural tendency of the leptons 8 to diverge in transit between the thermionic emitter 11 and the lepton target 6 result in the collision area of the leptons 8 on the lepton target 6 forming an annular field around the apex of the conical body. The resulting primary ionizing radiation 12 which is partially shadowed by the lepton target 6 is generally scattered with a distribution resembling an oblate spheroid. The effect is that the ionizing radiation 12 runs in all directions with rotational symmetry around the longitudinal axis of the apparatus, in order thereby to illuminate all the surrounding substrate or borehole structures simultaneously. The maximum output energy of the ionizing radiation 12 is directly proportional to the potential difference between the thermionic emitter 11 and the lepton target 6. If the thermionic emitter 11 exhibits a potential of −331,000 V and is coupled with a lepton target 6 with a potential of −331,000 V, this will give a potential difference of 662,000 V between the thermionic emitter 11 and the lepton target 6, which gives a resulting peak energy of the output ionizing radiation 12 in the order of 662,000 eV, corresponding to the primary output energy of caesium 137 which is commonly used in geological density logging operations. The thermal energy created by the interaction of the leptons 8 with the lepton target 6 is conducted to the electrically grounded, enveloping housing 1 by means of an electrically non-conductive heat conductor structure 13 geometrically and functionally resembling the rotationally symmetrical support structures 4 although, in a preferred embodiment, boron nitride is used in a higher volume percentage to provide higher efficiency in the heat conduction.

Figure 4:
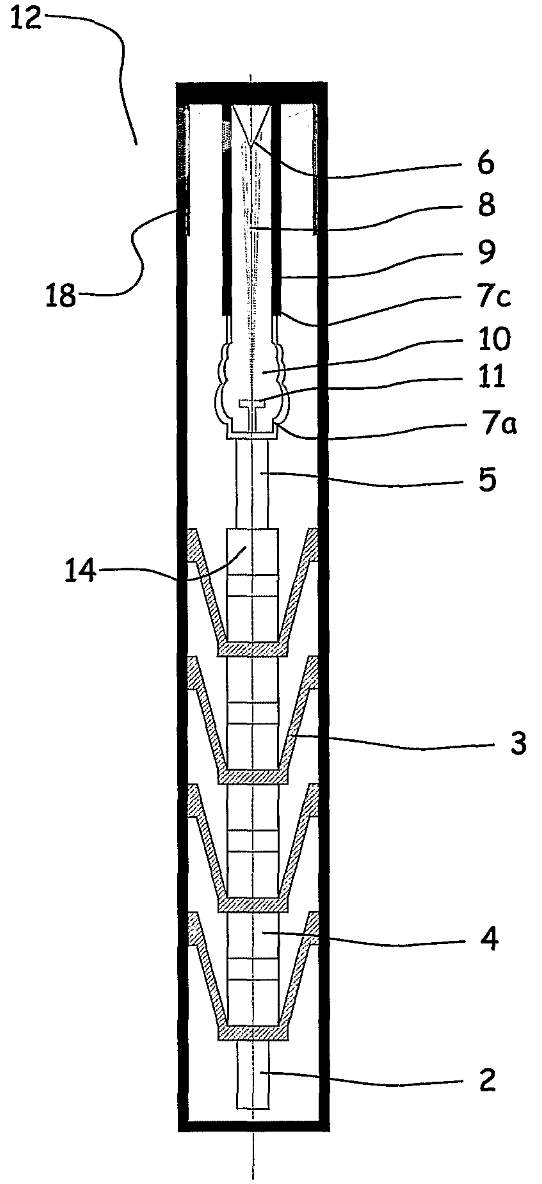
FIG. 4 shows a longitudinal section through a second single-polarity exemplary embodiment of an apparatus according to the invention, in which a thermionic emitter is connected to a series of electrical-potential-increasing elements and generates ionizing radiation in a radial direction from a grounded conical lepton target in a grounded vacuum container.
Figure 5:
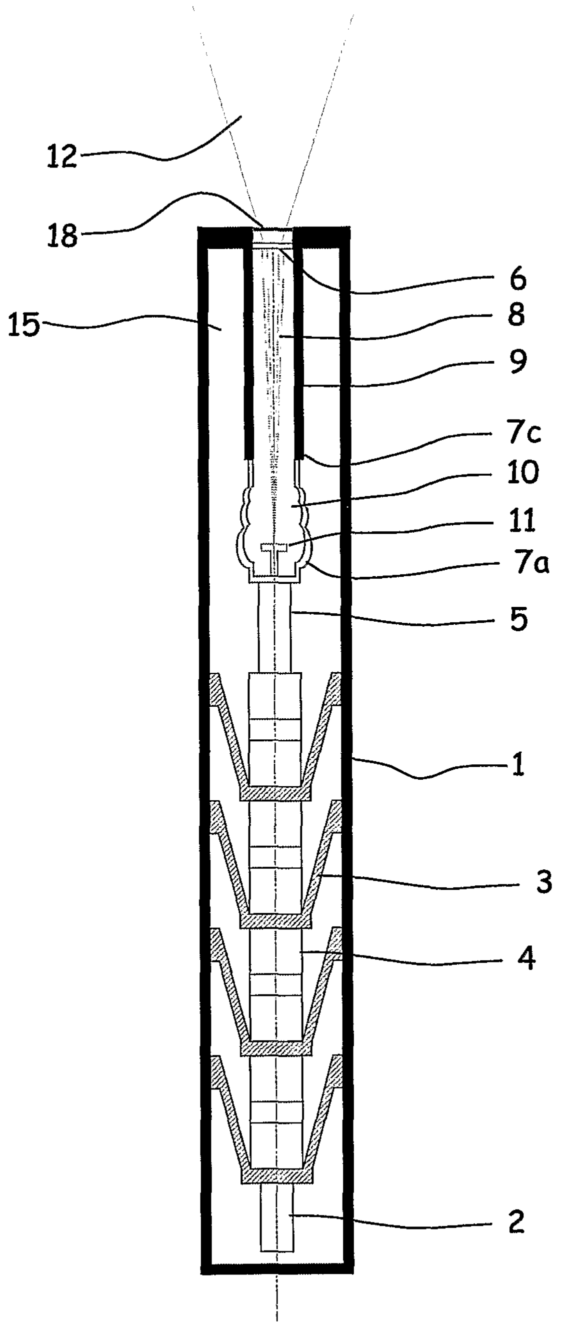
FIG. 5 shows a longitudinal section through a third single-polarity exemplary embodiment of an apparatus according to the invention, in which a thermionic emitter is connected to a series of electrical-potential-increasing elements and generates ionizing radiation in an axial direction out from a lepton target in a grounded vacuum container.

The potentials of the thermionic emitter 11 and the lepton target 6 may be varied individually, either intentionally or because of a stage failure. The overall potential difference between the thermionic emitter 11 and the lepton target 6 continues to be the summation of the two potentials. In the most preferable embodiment, the apparatus has been configured with dual polarity as herein described, but the apparatus may also function in a single-polarity mode, in which the lepton target 6 has an electrical ground potential by connection to the enveloping cylindrical housing 1, and the lepton target 6 is of such configuration that it may output radiation directed substantially in the axial or radial direction of the apparatus, as it appears from the FIGS. 4 and 5.

Figure 3:
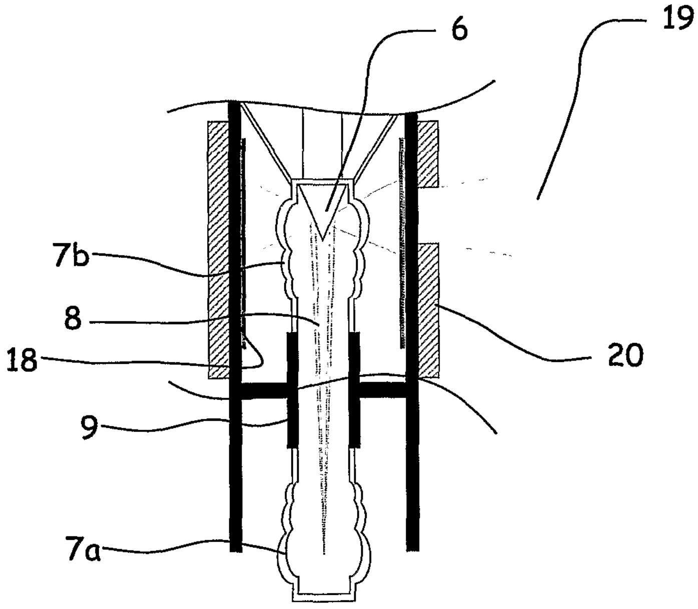
FIG. 3 shows, on a larger scale than FIG. 1, a section of a longitudinal section of a variant of the apparatus according to the invention, a beam shield with an aperture creating directionally controlled radiation being arranged around the lepton target.

In order better to simulate the output spectrum normally associated with chemical isotopes, a cylindrical spectrum-hardening filter 18 which envelops the radial output of the lepton target 6 may be used (see FIG. 3). In a preferred embodiment a spectrum-hardening filter 18 of copper and rhodium is used, but any material that filters ionizing radiation, or composites thereof, may be used, such as copper, rhodium, zirconium, silver and aluminium. The spectrum-hardening filter 18 has the effect of removing low-energy radiation and characteristic spectra associated with the radiation output of the lepton target 6, which increases the average energy of the entire emission spectrum towards higher photon energies, se the graphs of FIGS. 2*a*-2*d*. A combination of several filters 18 may also be used.

In a preferred embodiment the spectrum-hardening filter 18 is arranged in such a way that it can be moved into and out of the radiation in order thereby to effect variable spectrum filtration. A fixed filter or a fixed combination of several filters may also be used.

Where it is desirable to get directionally controlled emission from the lepton target 6, a rotatable or fixed cylindrical beam shield 20 with one or more apertures may be arranged around the output of the lepton target 6, which results in directionally controlled radiation 19 (see FIG. 3).

The apparatus and method provide ionizing radiation as a function of the electrical potential which is applied to the system. Consequently, the output of the system is many times larger than that achieved with the use of isotopes, resulting in the time required for logging a suitable amount of data during a logging operation being reduced considerably, which reduces the time consumption and the costs.

As the input potential of the system can be altered, which results in a possibility of increasing or decreasing the energy of the primary radiation correspondingly, the same system can replace a wide variety of chemical isotopes, each having a specific output photon energy, simply by the applied energy being adjusted to the particular need for radiation.

The modular electrical-potential-energy-increasing system results in a low-voltage current being supplied to the apparatus in the borehole as the high voltage required for the generation of the ionizing radiation is provided and controlled within the apparatus.

The system does not utilize radioactive chemical isotopes such as cobalt 60 or caesium 137, for example, and this eliminates all the drawbacks associated with control, logistics, environmental measures and safety measures when handling radioactive isotopes.

In addition the borehole technology requires the placement of radioactive, chemical isotopes to be in the part of a bottom-hole assembly that makes them as easily retrievable as possible from the drill string in case the bottom-hole assembly is lost during the drilling operation. For that reason the isotope may have to be placed up to 50 meters from the drill bit at a point where the drill string is connected to the bottom-hole assembly. An apparatus which does not contain radioactive substances and, consequently, may be abandoned, does not have to be positioned with retrieval in mind. Consequently, the radiation-emitting device, and thereby the detection system, may be placed closer to the drill bit for more real-time feedback from the borehole.

A variable radiation source also exhibits the advantage of enabling multiple logging operations at different energy levels without having to be removed from the borehole for readjustment, which makes a larger amount of data available to the operator in a short time.

What is claimed is:

1. Apparatus for the controllable downhole production of ionizing radiation which exceeds 200 keV with a predominant portion of the spectral distribution within the Compton range, wherein at least a thermionic emitter is arranged in a first end portion of an electrically insulated vacuum container, and a lepton target is arranged in a second end portion of the electrically insulated vacuum container, wherein the thermionic emitter is connected to a series of serially connected negative electrical-potential-increasing elements, and each of said electrical-potential-increasing elements being arranged to increase an applied direct-current potential by transforming an applied, driving voltage, and to transmit the increased, negative direct-current potential and also the driving voltage to the next unit in the series of serially connected elements.

2. The apparatus in accordance with claim 1, wherein the lepton target is formed in a rotationally symmetrical shape, said shape being either convex or concave.

3. The apparatus in accordance with claim 1, wherein the lepton target is connected to a series of serially connected positive electrical-potential-increasing elements, and each of said electrical-potential-increasing elements is arranged to increase an applied direct-current potential by transforming the high-frequency driving voltage, and to transmit the increased, positive direct-current potential and also the driving voltage to the next unit in the series of serially connected elements.

4. The apparatus in accordance with claim 1, wherein the driving voltage is a high-frequency alternating current with a frequency above 60 Hz.

5. The apparatus in accordance with claim 1, wherein a spectrum-hardening filter is arranged to eliminate a portion of low-energy radiation from the ionizing radiation generated.

6. The apparatus in accordance with claim 5, wherein a spectrum-hardening filter is formed of a material, an alloy, a composite or multiple said materials which may be actuated to provide variable filtering, said materials taken from the group consisting of copper, rhodium, zirconium, silver and aluminium.

7. The apparatus in accordance with claim 1, wherein at the lepton target a rotatable beam shield is arranged, with one or more apertures arranged to create adjustable directionally controlled radiation.

8. The apparatus in accordance with claim 1, wherein the apparatus includes a housing which is arranged to be pressurized with an electrically insulating substance in gaseous form.

9. The apparatus in accordance with claim 8, wherein the electrically insulating substance is pressurized sulphur hexafluoride.

10. The apparatus in accordance with claim 8, wherein the housing exhibits a transversal dimension which does not exceed 101 mm (4").

11. The apparatus in accordance with claim 1, wherein each electrical-potential-increasing element includes means arranged to apply an input potential equal to its own input potential to the next electrical-potential-increasing element.

* * * * *